United States Patent Office 2,868,802
Patented Jan. 13, 1959

2,868,802

2-(γ-TERT-BUTYL-O,O'-DIMETHYL-PHENYL-METHYL)-IMIDAZOLINE AND SALTS

Albrecht Hueni, Basel, Switzerland, assignor to Ciba Pharmaceutical Products Inc., Summit, N. J.

No Drawing. Application June 11, 1957
Serial No. 664,909

Claims priority, application Switzerland July 10, 1956

2 Claims. (Cl. 260—309.6)

This invention relates to the new compound, 2-(para-tertiary butyl-ortho:ortho'-dimethyl-phenyl-methyl)-imidazoline of the formula

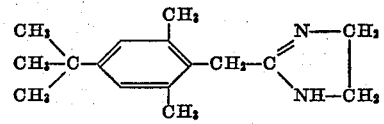

and salts thereof.

This view imidazoline has a vasoconstrictive and hypertensive effect and can therefore be used as a medicament. In particular it is useful as an agent for the decongestion of mucous membranes, e. g. those of the nose.

The new imidazoline is obtained by reacting para-tertiary-butyl-ortho:ortho'-dimethyl-phenyl-acetonitrile with ethylene diamine in the presence of a small amount of carbon disulfide whereby the imidazoline ring is formed with the splitting off of ammonia. Preferably, the reaction is carried out with the exclusion of moisture and at a temperature between 90° C. and 100° C. in an open vessel so that the ammonia formed can escape.

The new imidazoline can be isolated in the form of the free base from the reaction mixture by crystallization, e. g. from benzene with the addition of petroleum ether. From the base therapeutically useful acid addition salts can be made, for example, its salts with a hydrohalic acid, sulfuric acid, nitric acid, phosphoric acid, thiocyanic acid, acetic acid, propionic acid, oxalic acid, maleic acid, citric acid, tartaric acid, benzoic acid, methane sulfonic acid, ethane sulfonic acid, oxyethane sulfonic acid, salicylic acid, para-aminosalicylic acid, benzene sulfonic acid or toluene sulfonic acid.

The invention also includes pharmaceutical preparations which contain the new compound or a salt thereof in admixture with a pharmaceutical organic or inorganic carrier suitable for enteral, parenteral or topical administration. For making the carrier there are used substances which do not react with the new compounds, for example, water, gelatine, lactose, starches, magnesium stearate, talc, vegetable oils, benzyl alcohols, gums, polyalkylene glycols, white petroleum jelly, cholesterol or another known carrier for medicaments. The pharmaceutical preparations may be made up, for example, as tablets, dragees, salves, creams or in liquid form as solutions, suspensions or emulsions. If desired they may be sterilized and/or may contain auxiliary substances, such as preserving agents, stabilising agents, wetting agents or emulsifying agents, salts for regulating the osmotic pressure or buffers. They may also contain other therapeutically useful substances, for examples, antibacterial substances or antivirus substances. These pharmaceutical preparations contain per dosage unit, e. g. 0.01–100 mg., preferably 0.1–15 mg. of the new compound or of a salt thereof.

The starting materials used in the process of this invention are known.

The following example illustrates the invention without being intended to limit it:

Example 62 g. of para-tertiary-butyl-ortho:ortho'-dimethyl-phenyl-acetonitrile (obtainable, for example, by the method of Buu-Hoi and P. Cagniant, Bulletin de la Societe Chimique de France, volume 9, page 891 [1942]), 20.6 g. of ethylene diamine of 96 percent purity and 1.55 cc. of carbon disulfide are heated together in a distillation flask with the exclusion of moisture for 48 hours on a boiling water bath. Ammonia is evolved. Upon cooling the reaction product solidifies and is then dissolved in benzene, the solution is filtered while hot with the addition of animal charcoal and petroleum ether is added. The mixture is filtered to remove the impurities that are first precipitated and by the further addition of petroleum ether 2-(para-tertiary-butyl-ortho:ortho'-dimethyl-phenyl-methyl)-imidazoline of the formula

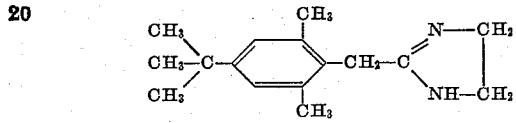

is caused to crystallize out. The product melts at 131–133° C. after being recrystallized from a mixture of benzene and petroleum ether. It can be converted into its hydrochloride as follows:

189 g. of 2-(para-tertiary-butyl-ortho:ortho'-dimethyl-phenyl-methyl)-imidazoline are dissolved in 400 cc. of absolute ethanol, the solution is rendered acid by the addition of 104 cc. of an ethanolic solution of hydrochloric acid of 30 percent strength, the mixture is filtered with the addition of animal charcoal, and dry ethyl acetate and absolute ether are added until crystallization sets in. After cooling the mixture, the salt is filtered off with suction and crystallized several times from absolute ethanol with the use of animal charcoal and the addition of dry mixture of ethyl acetate and ether. The hydrochloride so obtained melts at 327–329° C. (with decomposition).

It can be used therapeutically in the form of drops, for example, in a solution of the following composition:

|   | G. |
|---|---|
| 2-(para-tertiary butyl-ortho:ortho'-dimethyl-phenyl-methyl)-imidazoline hydrochloride | 1 |
| Para-hydroxybenzoic acid propyl ester | 0.8 |
| Para-hydroxybenzoic acid methyl ester | 0.4 |
| De-ionized water, to make up 1000 cc. | |

Moreover, it can be used for injections. To this end it is dissolved as follows, and the solution sterilized and used in ampuls:

|   | Mg. |
|---|---|
| 2-(para-tertiary butyl-ortho:ortho'-dimethyl-phenyl-methyl)-imidazole hydrochloride | 5 |
| NaH$_2$PO$_4$.2H$_2$O | 7 |
| Na$_2$HPO$_4$.12H$_2$O | 0.3 |
| NaCl | 14 |
| Distilled water, to make up 2 cc. | |

What is claimed is:

1. A member selected from the group consisting of 2-(para-tertiary butyl-ortho:ortho'-dimethyl-phenyl-methyl)-imidazoline and its pharmaceutically acceptable acid addition salts.

2. 2-(para-tertiary butyl-ortho:ortho'-dimethyl-phenyl-methyl)-imidazoline hydrochloride.

References Cited in the file of this patent

UNITED STATES PATENTS

| 2,161,938 | Sonn | June 13, 1939 |
| 2,778,836 | Morren | Jan. 22, 1957 |